(12) United States Patent
Li

(10) Patent No.: US 9,674,010 B2
(45) Date of Patent: Jun. 6, 2017

(54) UPDATING A FILTER OF AN EQUALIZER

(71) Applicant: Silicon Laboratories Inc., Austin, TX (US)

(72) Inventor: Junsong Li, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/283,661

(22) Filed: May 21, 2014

(65) Prior Publication Data
US 2015/0341063 A1 Nov. 26, 2015

(51) Int. Cl.
| | |
|---|---|
| H04L 25/00 | (2006.01) |
| H04L 25/03 | (2006.01) |
| H04L 27/00 | (2006.01) |
| H04B 1/14 | (2006.01) |
| H04L 27/14 | (2006.01) |

(52) U.S. Cl.
CPC ......... *H04L 25/03159* (2013.01); *H04B 1/14* (2013.01); *H04L 25/03019* (2013.01); *H04L 27/0002* (2013.01); *H04L 27/14* (2013.01); *H04L 2025/03675* (2013.01); *H04L 2025/03681* (2013.01); *H04L 2025/03726* (2013.01)

(58) Field of Classification Search
CPC ......... H04L 25/0305; H04L 2027/0038; H04L 25/0307; H04L 7/0058
See application file for complete search history.

(56) References Cited

U.S. PATENT DOCUMENTS

| | | | |
|---|---|---|---|
| 5,809,399 A | 9/1998 | Tuutijarvi et al. | |
| 6,047,171 A | 4/2000 | Khayrallah et al. | |
| 7,116,958 B1 | 10/2006 | Brown et al. | |
| 7,277,679 B1* | 10/2007 | Barratt | H04B 7/084 375/347 |
| 7,319,659 B2* | 1/2008 | Tsuie | H04L 27/2647 370/203 |
| 7,450,518 B2* | 11/2008 | Yousef | H03H 21/0012 370/228 |
| 7,796,708 B2* | 9/2010 | Yehudai | H04L 27/38 375/143 |
| 8,078,129 B2 | 12/2011 | Lindstrom et al. | |
| 8,290,457 B2 | 10/2012 | Li | |
| 8,433,271 B2 | 4/2013 | Li | |
| 8,559,574 B2 | 10/2013 | Shi et al. | |
| 2005/0157780 A1* | 7/2005 | Werner | H04L 25/028 375/232 |
| 2005/0181741 A1* | 8/2005 | Raj | H03D 3/006 455/73 |
| 2007/0041116 A1* | 2/2007 | Kajiwara | 360/51 |

(Continued)

OTHER PUBLICATIONS

Silicon Laboratories Inc., "Si475x-A10—High Performance Automotive AM/FM Radio Receiver," 2010, 2 pages.

*Primary Examiner* — Daniel Washburn
*Assistant Examiner* — Eboni Hughes
(74) *Attorney, Agent, or Firm* — Trop, Pruner & Hu, P.C.

(57) ABSTRACT

In one aspect, a tuner includes an analog front end to receive a radio frequency (RF) signal and to downconvert the RF signal to a second frequency signal, a digitizer to convert the second frequency signal to a digitized signal, a channel equalizer including a filter to filter the digitized signal, and a first controller to update the filter according to a frequency response of the filter.

21 Claims, 5 Drawing Sheets

(56) References Cited

U.S. PATENT DOCUMENTS

| | | | |
|---|---|---|---|
| 2008/0159421 A1* | 7/2008 | Chen | ............... H04L 27/2614 |
| | | | 375/260 |
| 2011/0044414 A1 | 2/2011 | Li | |
| 2013/0260707 A1 | 10/2013 | Li | |

* cited by examiner

UPDATING A FILTER OF AN EQUALIZER

BACKGROUND

Ideally, an FM signal is of constant modulus. Frequency selective multipath fading can cause distortion to a demodulated audio signal and destroy this constant-modulus property. The constant modulus algorithm (CMA) was proposed to minimize multipath effects by restoring the constant modulus feature of the received FM signal. CMA is one kind of blind adaptive algorithm, which is performed using only magnitude information regarding the strength of a processed signal. At weak RF levels, CMA usually can form a very narrow bandwidth low pass filter (LPF) to suppress effects of RF system noise around an FM carrier. However, the effective bandwidth can be so narrow under certain conditions that artificial effects are caused in a resulting FM audio output, which is not desired. Specifically, undesired clipping, dropouts and other distortions can result from use of a CMA algorithm.

SUMMARY OF THE INVENTION

In one aspect, a tuner includes an analog front end to receive a radio frequency (RF) signal and to downconvert the RF signal to a second frequency signal, a digitizer to convert the second frequency signal to a digitized signal, a channel equalizer including a filter to filter the digitized signal, and a first controller to update the filter according to a frequency response of the filter. The tuner may further include a second controller to update the filter based on a blind adaptive algorithm, which in an embodiment is a constant modulus algorithm.

Note that the first and second controllers may be configured to independently update the filter. The first controller may be configured to update one or more taps of the filter to increase a bandwidth of the filter. In an embodiment, the first controller includes: a frequency response determination logic to determine a magnitude value of the frequency response of the filter; a comparison logic to compare the magnitude value to a reference value to generate an error signal; and a tap update logic to update one or more taps of the filter based on the error signal.

In an embodiment, the tuner may further include a control logic to selectively enable the first controller based at least in part on a condition of the RF signal. As an example, the control logic may include a deviation logic to enable the first controller based at least in part on a deviation of a demodulated signal obtained from the RF signal. Still further, the control logic may include a fading logic to enable the first controller based at least in part on a fading of the RF signal.

In another aspect, a system includes: an antenna to receive a RF signal; and a radio receiver coupled to the antenna to receive and process the RF signal to output an audio signal. The radio receiver may include an analog front end to receive the RF signal and downconvert the RF signal to a second frequency signal, an analog-to-digital converter (ADC) to convert the second frequency signal to a digitized signal, and a digital signal processor (DSP) to receive and demodulate the digitized signal and to provide a digital audio output. The DSP may have a signal processing path including a filter with controllable coefficients. Such coefficients may be controllable based at least in part on a frequency response of the filter.

The receiver may further include a first controller to update the controllable coefficients according to a frequency response of the filter, and a second controller to update the controllable coefficients based on a blind adaptive algorithm. The controllers may be configured to independently update the controllable coefficients.

In an embodiment, the receiver further includes a control logic to selectively enable the first controller based at least in part on a condition of the RF signal, e.g., based on one or more of a deviation of a demodulated signal obtained from the RF signal and a fading level of the RF signal.

In yet another aspect, a method includes: obtaining filter taps of an equalizer filter of a tuner processing an incoming RF signal, in a frequency response controller of the tuner; obtaining a magnitude response corresponding to a frequency response of the equalizer filter, based at least in part on a discrete Fourier transform performed on the filter taps; comparing the magnitude response to a reference value to obtain an error signal; and adjusting one or more of the filter taps based on the error signal.

The method may include adjusting the filter taps independently of a constant modulus filter tap update mechanism. In another embodiment, a first set of filter tap updates obtained using the error signal and a second set of filter tap updates obtained using a constant modulus filter tap update mechanism may be weighted, and the filter taps may be adjusted based on the weighting.

In an embodiment, the frequency response controller may be enabled if a fading value of the incoming RF signal is less than a first threshold value and disabled if the fading value is greater than a second threshold value.

DETAILED DESCRIPTION

In various embodiments, a radio tuner, such as an FM tuner or a multi-band tuner including an FM mode, may be provided with a control technique to ensure that appropriate updating of one or more filter structures such as an equalizer filter occurs to avoid collapsing a bandwidth of the filter. Such bandwidth filter collapse may occur as a result of a conventional blind adaptive algorithm-based filter update technique. In some cases, an independent control technique may be provided to independently update one or more filters based at least in part on a frequency response of the filter. Such control technique may operate independently of a conventional blind algorithm-based update technique and may be selectively enabled or disabled and/or controlled to operate at a selectable rate based on environmental conditions, including RF channel behavior and/or a type of content.

Figure 1:
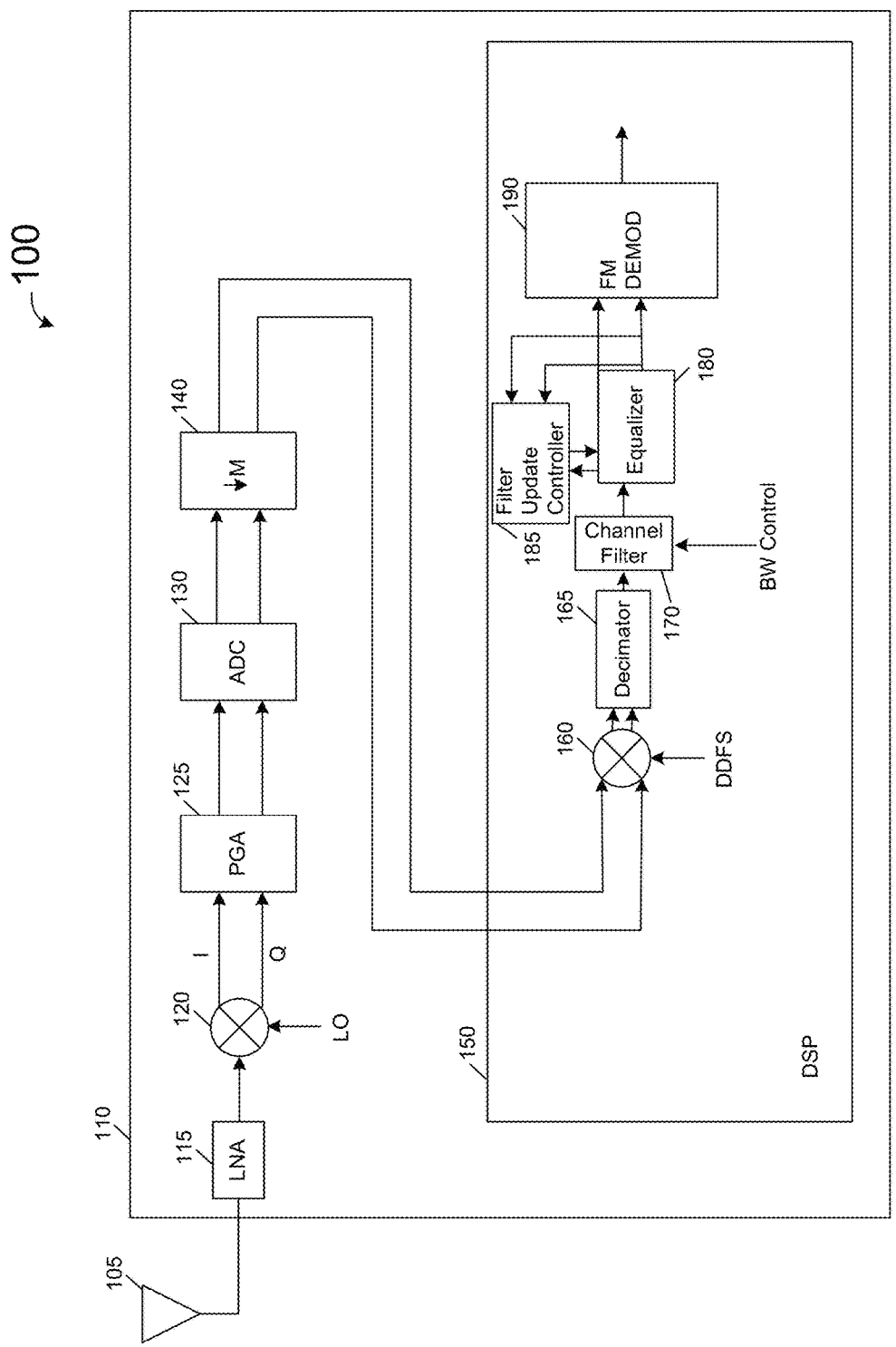
FIG. 1 is a block diagram of a portion of a radio receiver in accordance with one embodiment.

Referring now to FIG. 1, shown is a block diagram of a portion of a radio receiver in accordance with one embodiment. As shown in FIG. 1, receiver 100 may include a single die semiconductor device 110 including both analog and digital circuitry. As an example, a complementary metal oxide semiconductor (CMOS) die can be a mixed-signal device to handle receipt and processing of incoming RF signals. In different implementations, the receiver may be a multi-band receiver such as an amplitude modulation (AM)/ frequency modulation (FM)/weatherband (WB) receiver, although other variations are possible.

As seen in FIG. 1, receiver 100 includes an antenna 105 configured to receive RF signals and provide them to an integrated circuit (IC) 110. In general, IC 110 may include an analog front end, along with a digital signal processor (DSP) 150 to further process downconverted signals. The analog front end including various filtering, mixing, signal processing and analog-to-digital conversion circuitry may be present (although not shown for ease of illustration in FIG. 1) to receive and process an RF signal before providing it to the DSP. In the embodiment shown in FIG. 1, the signal processing path includes a low noise amplifier (LNA) 115 to receive and amplify the incoming RF signals. In turn, these amplified RF signals are provided to a complex mixer 120 to downconvert the signals to a lower frequency such as an intermediate frequency (IF) and generate complex signals, namely in-phase (I) and quadrature (Q) signals. In turn, these signals may be provided to a programmable gain amplifier (PGA) 125 for further amplification before being provided to a converter, namely an analog-to-digital converter (ADC) 130, to be digitized. These digitized signals may have their sampling rate reduced in a decimator 140 which in one embodiment may be configured as a decimator by 25.

These lower sampling rate digitized signals may be provided to DSP 150 that can perform further signal processing as well as demodulation of the signals. Although many processing engines may be included within the DSP, shown for ease of illustration are high level components involved in the processing and demodulation of FM signals. Understand that various other circuitry may be present in DSP to perform processing and demodulation of other signals such as weatherband signals, AM signals and so forth.

In the embodiment of FIG. 1, the DSP signal processing path may receive incoming I and Q signals at a relatively high sampling rate (e.g., at 1.488 Mega samples per second (Ms/s)). These incoming signals may be at an intermediate frequency (IF) and may be provided to DSP 150, which may include mixer 160 which can further downconvert the incoming complex digitized signals to digitized complex baseband signals based on a mixing signal received from a direct digital frequency synthesizer. The downconverted signals can include a signal of a desired channel and one or more blocking signals of blocking channels. In turn, these complex signals may be provided to a decimator 165 which can further reduce the sampling rate, e.g., from 1.488 Ms/s to a rate of 372 kilo samples per second (ks/s) in one embodiment. These reduced sampling rate signals may be provided to a channel filter 170 which in one embodiment can be configured as a finite impulse response (FIR) filter to provide protection against adjacent channel interference. Note that the bandwidth of channel filter 170 can be dynamically controlled, e.g., based on information determined with regard to blocking signals located near a desired signal channel.

In turn, filter 170 is coupled to an equalizer 180, which is configured to perform equalization. In an embodiment, equalizer 180 includes a filter such as FIR filter. The resulting filtered signals can be provided to a demodulator 190 to perform demodulation to thus output FM demodulated signals, which can be further processed in additional circuitry of the DSP.

As further seen, a filter update controller 185 is coupled to equalizer 180 to control updating coefficients or taps of the filter. As will be described, herein multiple independent control mechanisms are provided via controller 185 to enable dynamic updates to the filter of equalizer 180, e.g., based on environmental conditions and/or a type of content being communicated.

Although shown at this high level in the embodiment of FIG. 1, understand variations are possible. Also while not shown for ease of illustration, understand that the DSP may be part of a multi-function device including both receive and transmit capabilities. In addition, the receiver may include a storage such as a non-volatile storage including software, firmware, or combinations thereof to enable the DSP or other circuitry to operate in AM/FM/WB modes and to perform the control techniques described herein, and may further enable transmission as well as reception operations.

Figure 2:
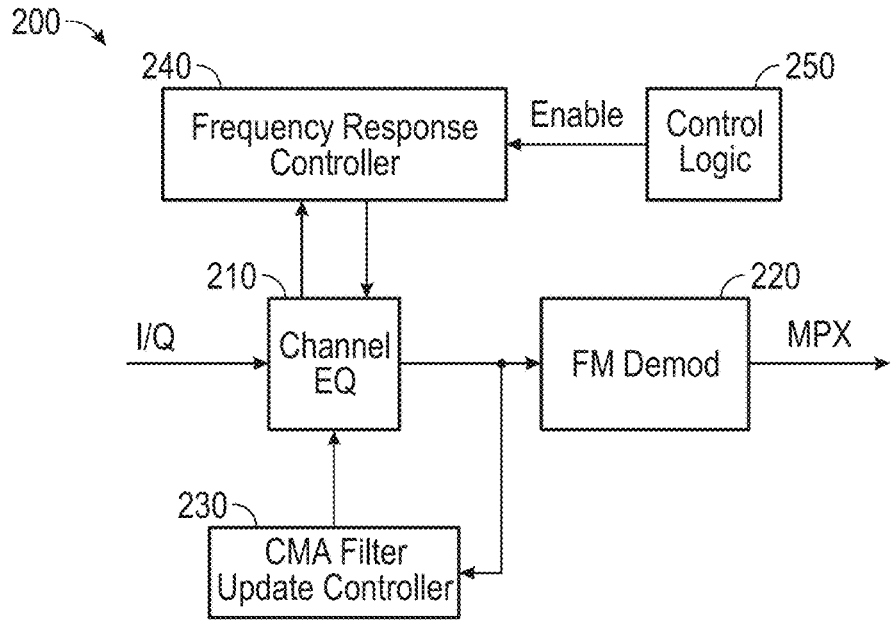
FIG. 2 is a block diagram of a portion of a tuner in accordance with an embodiment.

Referring now to FIG. 2, shown is a block diagram of a portion of a tuner in accordance with an embodiment. More specifically, FIG. 2 shows a portion of a signal processing path 200 having a channel equalizer 210 that receives incoming baseband signals. In an embodiment, these baseband signals may be complex signals downconverted (e.g., to baseband or another downconverted frequency) from incoming RF signals. Equalizer 210 includes, in an embodiment, a filter such as a FIR filter. In an embodiment, this FIR filter may be a multi-tap filter, e.g., including between approximately 20-30 taps, depending on the desired complexity and filtering capabilities. In turn, each tap may be configured with a multi-bit value (e.g., a 24 bit value in an embodiment). After being filtered in equalizer 210, resulting filtered baseband signals may be provided to a demodulator 220 which may perform demodulation and additional processing on the filtered baseband signals.

Equalizer 210 may be controlled in different manners independently. Depending on mode of operation and the conditions in which the tuner is operating, one or more of a CMA filter update controller 230 and a frequency response controller 240 may be used to update some or all taps of the filter of equalizer 210.

In general, CMA filter update controller 230 may be configured as a conventional CMA algorithm-based controller to provide tap updates using a CMA algorithm. However, as described above, in certain situations operation of such a controller is not ideal, in that issues can arise with regard to improper filter bandwidth control in certain fading and other conditions.

To this end, frequency response controller 240 may be configured to independently update taps of the filter of channel equalizer 210. More specifically, controller 240 may update the taps based on a frequency response of the filter, such that the adverse effects of a CMA-based technique can be avoided. Frequency response controller 240 may act essentially as a bandwidth enforcer to ensure that the bandwidth of the equalizer filter does not collapse as result of CMA-based updates.

Understand that while in typical implementations both of these control paths may be active (and independent), in certain embodiments particularly based on operating conditions, the updates generated by the different control paths may be weighted and combined to generate tap updates. Also understand that while a CMA-based tap update technique may typically be enabled in all conditions, it is possible for the frequency response control technique to be selectively enabled only in certain situations. For example, as will be described further below in cases where fading (e.g., multi-path fading) is relatively limited, the frequency response technique may be enabled and instead in cases where fading effects are significant, this technique may be disabled. Similarly, where high deviation exists in the content of the resulting demodulated signal (e.g., spoken content as compared to musical content) the frequency response technique may be enabled, and vice versa. Of course understand that in other implementations, different conditions may cause one or both of these different and independent tap update mechanisms to be enabled/disabled or otherwise controlled.

Still referring to FIG. 2, note that a control logic 250 is coupled to controller 240. In various embodiments, control logic 250 may be configured to selectively enable or disable and otherwise configure one or more of controllers 230 and 240, e.g., based on RF conditions in an environment in which the tuner is located and/or message content. For example, based on a level of fading as determined from a received RF signal, controller 240 may be selectively enabled (e.g., in low fading conditions). Furthermore, controller 240 may be selectively enabled based on a type of message content. For example, when large deviations exist in a resulting demodulated signal, indicating presence of speech content (in contrast to relatively minimally deviated signals in the case of music) controller 240 may be selectively enabled.

Figure 3:
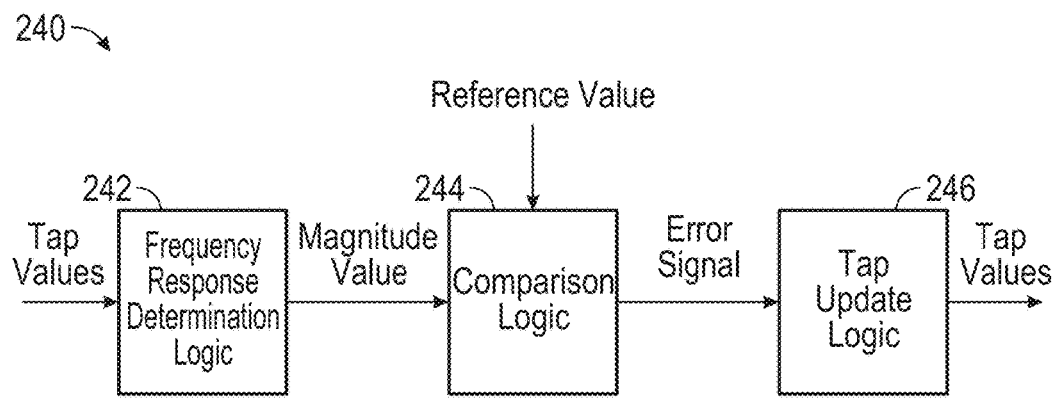
FIG. 3 is a block diagram of further details of a frequency response controller in accordance with an embodiment.

Referring now to FIG. 3, shown is a block diagram of further details of a frequency response controller in accordance with an embodiment. As shown in FIG. 3, controller 240 includes various logics which can each be implemented as hardware, software, firmware and/or combinations thereof. For example in an embodiment, a DSP may include various logic blocks to perform the frequency response control functions described herein.

In the embodiment shown, controller 240 includes a frequency response determination logic 242 configured to receive incoming tap values from the filter taps of the equalizer filter. In an embodiment, determination logic 242 may determine a frequency response of the resulting filter based on a discrete Fourier transform (DFT), which may be implemented using a DFT engine of logic 242, to determine a magnitude response at a given frequency. Note that in an embodiment, a frequency range of interest may roughly correspond to a selected portion of a FM channel bandwidth. For example, assume a channel bandwidth of 100 kilohertz (centered around 0 Hz). Given this channel bandwidth, the portion of the frequency band of interest may be roughly 40 kilohertz (+/−20 kHz). This is so, as this small bandwidth includes the frequency response for speech, which when transmitted by FM signaling, can often be corrupted by a filter mechanism having a too narrow bandwidth, resulting in clipping, clicking or other undesired impairment.

To ease computation, instead of analyzing a full set of frequency bins in this frequency range under analysis, only a few frequency points may be analyzed. In an embodiment, a relatively small set of predetermined frequency points, e.g., between approximately 4-6 frequency points, may be analyzed. For example in one embodiment, given a frequency range of +/−20 kHz, frequency points at 0, +/−5 kHz and +/−10 kHz may be analyzed.

Still with reference to frequency response determination logic 242, the logic may calculate the DFT value to thus generate a magnitude response corresponding to the frequency response (e.g., bandwidth) of the filter at a given frequency point (which in an embodiment may be realized by squaring the DFT result). Such magnitude value may then be provided to a comparison logic 244 which compares this magnitude value to a reference value, which in an embodiment may be a predetermined constant (e.g., 1). As such, comparison logic 244 generates an error signal which indicates variance from this reference value.

In turn, this error signal may be used to generate updated tap values in a tap update logic 246. In an embodiment, the error signal obtained may be further processed to generate updated tap values that seek to drive this error signal to a minimum (e.g., 0) value. The resulting tap values may be provided to the filter to thus update the tap values.

In an embodiment, frequency response determination logic 242 may determine a magnitude value in accordance with the following equation:

$$\sum_{m=0}^{N-1} e^{-imw_0} * h(m) \qquad [\text{EQ. 1}]$$

In Equation 1, a convolution is performed in which m corresponds to a tap index value, ω0 is the frequency of interest, and h(m) is the tap value (i.e., a coefficient value) for the corresponding tap index (for a filter having N taps).

Note that a frequency response magnitude determined according to EQ. 1 may have a negative value. To avoid this situation, in some embodiments logic 242 may square the determined magnitude value to thus guarantee that the magnitude value output is positive.

In an embodiment, comparison logic 244 may be configured to perform a comparison based on a cost function. This cost function may incorporate the magnitude determination of EQ. 1 as follows, in an embodiment:

$$\min_{h} J = \left\{ \left[ \sum_{n=0}^{N-1} e^{-imw_0} * h(m) \right]^2 - 1 \right\}^2 \qquad [\text{EQ. 2}]$$

Here note that the reference value is 1. However understand that this number can vary in different embodiments. Desirably, this cost function is driven to a predetermined and constant value (e.g., 0) such that the error value is as small as possible.

Based on this cost function analysis, a tap update occurs in tap update logic 246. In an embodiment, tap update logic 246 determines a tap update in accordance with the following equation:

$$h(k)^n = h(k)^{n-1} -$$
$$\mu \times \left\{ \left[ \sum_{m=0}^{N-1} e^{-im\omega o} \times h(m) \right]^2 - 1 \right\} \times \left[ \sum_{m=0}^{N-1} e^{-im\omega o} \times h(m) \right] \times e^{ik\omega o} \qquad [\text{EQ. 3}]$$

Here, k equals 0, 1, 2, ... N−1, $h(k)^{n-1}$ is the old tap value and μ is the LMS updating step, which in an embodiment may be 0.0125. Thus this frequency response control of tap values can be realized using a least mean squared (LMS)-based algorithm. For each tap of the multi-tap filter, a new tap value $h(k)^{n-1}$ corresponds to a previous value for the tap minus a value weighted by the LMS updating step.

Figure 4:
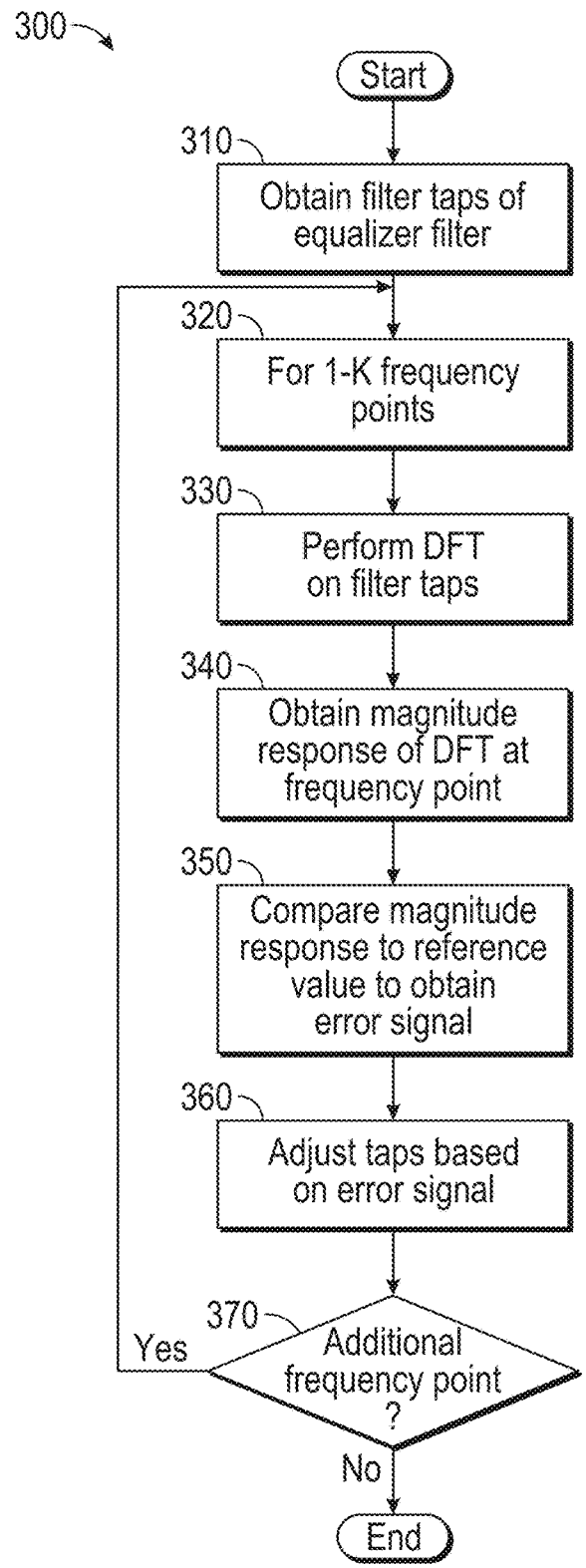
FIG. 4 is a flow diagram of a method in accordance with an embodiment.

Referring now to FIG. 4, shown is a flow diagram of a method in accordance with an embodiment. In the embodiment shown in FIG. 4, method 300 generally corresponds to a frequency response-controlled adjustment to one or more filter taps of a filter such as an equalizer filter, as described herein. Thus method 300 may be performed, in an embodiment, by a frequency response controller such as controller 240 of FIG. 2.

As seen, method 300 begins by obtaining filter taps of an equalizer filter (block 310). In an embodiment, the controller may receive the coefficients of each of the filter taps of the equalizer filter.

Next control passes to block 320, which is a beginning of a loop performed for K frequency points (e.g., a relatively small set of preselected frequency points). For each such frequency point, various operations are performed to generate certain values and provide an update value to taps of the filter. At block 330 a DFT may be performed on the filter taps to determine a frequency response of the filter at the given frequency point, e.g., according to EQ. 1, above. Next at block 340 a magnitude response of the DFT may be obtained.

Still referring to FIG. 4, control next passes to block 350 where this magnitude response may be compared to a reference value to obtain an error signal. Although embodiments vary, as one example this reference value may be a value of one. Such comparison may be in accordance with EQ. 2 above. The obtained error signal may be used to adjust some or all of the taps of the filter (block 360). For example, in an embodiment the tap adjustment process may be performed using a LMS update technique in accordance with EQ. 3 above. Finally, control passes to diamond 370 to determine whether additional frequency points of interest are to be analyzed. If so, the loop begins at block 320 again. Otherwise, method 300 ends.

Figure 5:
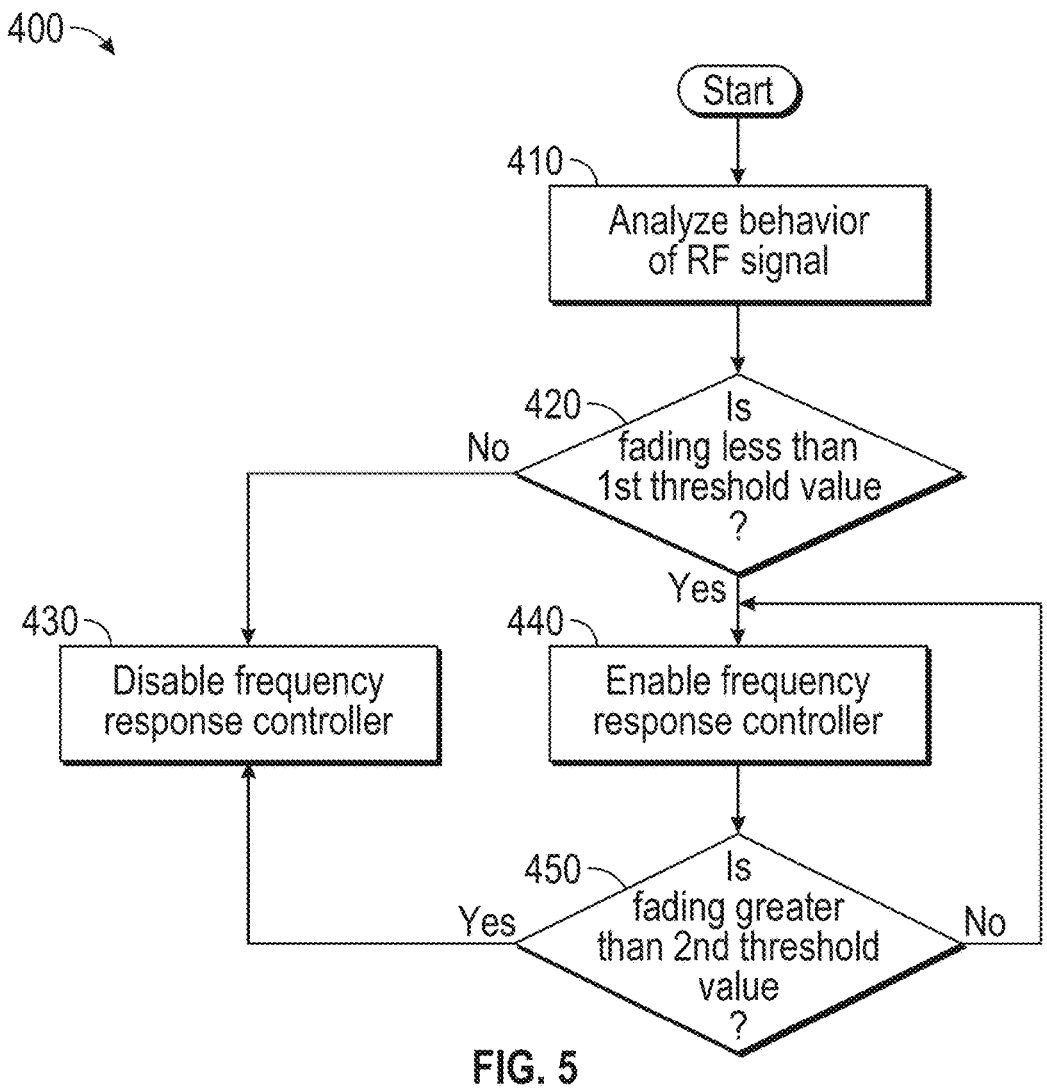
FIG. 5 is a flow diagram of a method for controlling a frequency response controller in accordance with an embodiment.

As described above, in some cases a control logic may selectively enable or disable a frequency response controller as described herein. Referring now to FIG. 5, shown is a flow diagram of a method for controlling a frequency response controller in accordance with an embodiment. As seen, method 400 of FIG. 5 may be performed by a control logic, which may be part of a microcontroller unit (MCU), other microcontroller or other control logic of a tuner or a system including such tuner.

Method 400 begins by analyzing a behavior of an incoming RF signal (block 410). While the behavior of the RF signal may be analyzed in different manners, as an example, fading characteristics may be analyzed. Control next passes to diamond 420 to determine whether the fading is less than a first threshold value. As an example, this first threshold value may correspond to a given fading power level which may be, as an example, 2-4 dB. If so, control passes to block 440 where the frequency response controller may be enabled.

During operation of the frequency response controller, control logic may continue method 400 and determine whether fading becomes greater than a second threshold value (diamond 450). Note that this second threshold value may be at a different level, e.g., a slightly higher fading power level than the first fading power level, to apply a measure of hysteresis. If the fading level does not exceed the second threshold value, continued frequency response controller operation occurs. Otherwise control passes to block 430 where the frequency response controller may be disabled. Note that block 430 is also reached if at diamond 420 it is determined that the fading is less than the first threshold value.

Understand that while described with this particular implementation in the FIG. 5 embodiment, variations and alternatives are possible. That is, control of a frequency response controller may be based on other metrics and in other manners. For example, instead of the fading-based control, another embodiment may enable/disable frequency response control based on deviation characteristics of resulting demodulated signal (and/or combinations of these multiple signal characteristics). To this end, in various embodiments, the MCU or other control logic may include a fading detector and a deviation detector to determine the behavior of the incoming RF signal and/or demodulated signal. A DSP and/or MCU may execute instructions stored in a non-transitory storage medium to perform filter update control, in some embodiments.

Furthermore, understand that while the above discussion relates to selective enabling/disabling, it is possible also to control the rate or frequency of the updating performed by the frequency response controller. That is, in situations with a relatively low fading environment, the frequency response controller may be controlled to run at a first rate and instead in greater fading conditions, the frequency response controller may be controlled to run at a second, slower rate. Similarly, the frequency response controller can be controlled to run at different rates based on deviation conditions.

Furthermore, while selective control of a frequency response controller is described, understand that similar control mechanisms may be used to control other filter update mechanisms, such as a CMA-based controller. Furthermore, understand that when a frequency response controller is enabled, in some implementations controllable selective combining of filter updates from both a frequency response controller and CMA controller may occur, rather than the above-described independent control mechanisms.

Figure 6:
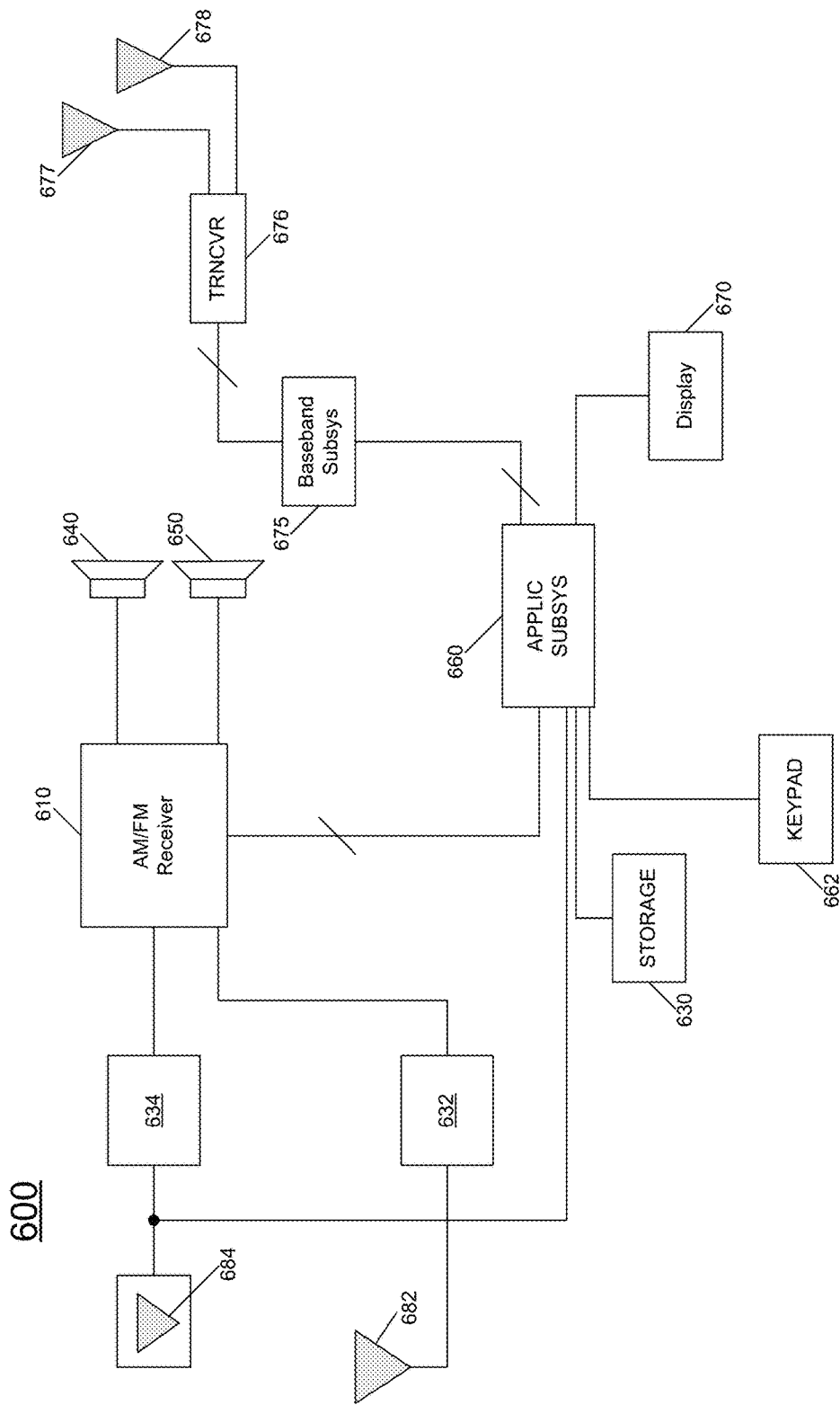
FIG. 6 is a block diagram of a system in accordance with one embodiment.

Referring to FIG. 6, in accordance with some embodiments, an AM/FM receiver 610 (such as an implementation of that shown in the embodiment of FIG. 6) may be part of a multimedia device 600. As examples, the device 600 may be an automobile entertainment system, a portable wireless device such as a dedicated MP3 player, a cellular telephone or PDA with audio capabilities, or other such devices.

Among its other functions, the device 600 may store digital content on a storage 630, which may be a flash memory, hard disk drive, or an external device such as a portable media player, as a few examples. The device 600 generally includes an application subsystem 660 that may, for example, receive input from a keypad 662 of the device 600 and display information on a display 670. Furthermore, the application subsystem 660 may generally control the retrieval and storage of content from the storage 630 and the communication of, e.g., audio with the AM/FM receiver 610. As shown, AM/FM receiver 610 may be directly connected to speakers 640 and 650 for output of audio data. As depicted in FIG. 6, the AM/FM receiver 610 may be coupled by a matching network 632 to an FM receiver antenna 682 and may be coupled by a matching network 634 to an AM receiver antenna 684, which can be tunable or programmable, e.g., via application subsystem 660 that provides control information to control matching network 634.

In accordance with some embodiments, device 600 may also have the ability to communicate over a communications network, such as a cellular network. For these embodiments, the device 600 may include a baseband subsystem 675 that is coupled to the application subsystem 660 for purposes of encoding and decoding baseband signals for this wireless network. Baseband subsystem 675 may be coupled to a transceiver 676 that is connected to corresponding transmit and receive antennas 677 and 678.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A tuner comprising:
   an analog front end to receive a radio frequency (RF) signal and to downconvert the RF signal to a second frequency signal;
   a digitizer to convert the second frequency signal to a digitized signal;
   a channel equalizer including a filter to filter the digitized signal;
   a first controller to update the filter according to a frequency response of the filter, the first controller comprising:
      a frequency response determination logic to receive a plurality of taps of the filter and determine based thereon a magnitude value of the frequency response of the filter;
      a comparison logic to compare the magnitude value to a reference value to generate an error signal based on a cost function according to $$\min_h J = \left\{ \left[ \sum_{m=0}^{N-1} e^{-im w_0} * h(m) \right]^2 - 1 \right\}^2;$$

and
      a tap update logic to update one or more taps of the plurality of taps of the filter based on the error signal.

2. The tuner of claim 1, further comprising a second controller to update the filter based on a blind adaptive algorithm, wherein the first controller and the second controller are configured to independently update the filter.

3. The tuner of claim 1, wherein the first controller is to update the one or more taps of the filter to increase a bandwidth of the filter.

4. The tuner of claim 1, wherein the frequency response determination logic is to determine the magnitude response of the filter for each of a first plurality of frequency points.

5. The tuner of claim 4, wherein the first plurality of frequency points are within a first portion of a radio channel.

6. The tuner of claim 1, wherein the tap update logic is to update the one or more taps of the filter based on the error signal according to a least mean squared technique according to $$h(k)^n = h(k)^{n-1} - \mu \times \left\{ \left[ \sum_{m=0}^{N-1} e^{-im\omega o} \times h(m) \right]^2 - 1 \right\} \times \left[ \sum_{m=0}^{N-1} e^{-im\omega o} \times h(m) \right] \times e^{ik\omega o}.$$

7. The tuner of claim 1, further comprising a control logic to selectively enable the first controller based at least in part on a condition of the RF signal.

8. The tuner of claim 7, wherein the control logic comprises a deviation logic to enable the first controller based at least in part on a deviation of a demodulated signal obtained from the RF signal.

9. The tuner of claim 7, wherein the control logic comprises a fading logic to enable the first controller based at least in part on a fading of the RF signal being less than a first threshold.

10. The tuner of claim 1, wherein the first controller is to perform a discrete Fourier transform on the plurality of taps of the filter to determine the frequency response of the filter.

11. The tuner of claim 1, wherein the first controller is to determine the frequency response of the filter based on a discrete Fourier transform performed in a frequency range corresponding to a selected portion of a channel bandwidth of a radio channel.

12. A system comprising:
    an antenna to receive a radio frequency (RF) signal; and
    a radio receiver coupled to the antenna to receive and process the RF signal to output an audio signal, the radio receiver including:
       an analog front end to receive the RF signal and downconvert the RF signal to a second frequency signal;
       an analog-to-digital converter (ADC) to convert the second frequency signal to a digitized signal;
       a digital signal processor (DSP) to receive and demodulate the digitized signal and to provide a digital audio output, the DSP having a signal processing path including a filter having controllable coefficients, the coefficients controllable based at least in part on a frequency response of the filter determined based at least in part on the controllable coefficients; and
       a first controller to update the controllable coefficients according to the frequency response of the filter, wherein the first controller is to determine an error signal according to $$\min_h J = \left\{ \left[ \sum_{m=0}^{N-1} e^{-im w_0} * h(m) \right]^2 - 1 \right\}^2,$$

and to update one or more of the controllable coefficients based on the error signal according to a least mean squared technique according to $$h(k)^n = h(k)^{n-1} - \mu \times \left\{ \left[ \sum_{m=0}^{N-1} e^{-im\omega o} \times h(m) \right]^2 - 1 \right\} \times \left[ \sum_{m=0}^{N-1} e^{-im\omega o} \times h(m) \right] \times e^{ik\omega o}.$$

13. The system of claim 12, further comprising a second controller to update the controllable coefficients based on a blind adaptive algorithm, wherein the first controller and the second controller are configured to independently update the controllable coefficients.

14. The system of claim 12, further comprising a control logic to selectively enable the first controller based at least in part on a condition of the RF signal, wherein the control logic is to enable the first controller based on one or more of a deviation of a demodulated signal obtained from the RF signal and a fading level of the RF signal.

15. The system of claim 12, wherein the first controller is to perform a discrete Fourier transform on the controllable coefficients of the filter to determine the frequency response of the filter.

16. A method comprising:
obtaining filter taps of an equalizer filter of a tuner processing an incoming radio frequency (RF) signal, in a frequency response controller of the tuner;
obtaining a magnitude response corresponding to a frequency response of the equalizer filter, based at least in part on a discrete Fourier transform performed on the filter taps;
comparing the magnitude response to a reference value to obtain an error signal based on a cost function according to $$\min_h J = \left\{ \left[ \sum_{m=0}^{N-1} e^{-im w_0} * h(m) \right]^2 - 1 \right\}^2;$$

and
adjusting one or more of the filter taps based on the error signal.

17. The method of claim 16, further comprising adjusting the one or more filter taps independently of a constant modulus filter tap update mechanism.

18. The method of claim 16, further comprising:
weighting a first set of filter tap updates obtained using the error signal and a second set of filter tap updates obtained using a constant modulus filter tap update mechanism; and
adjusting the one or more filter taps based on the weighting.

19. The method of claim 16, further comprising selectively enabling the frequency response controller based on behavior of the incoming RF signal.

20. The method of claim 19, further comprising:
enabling the frequency response controller if a fading value of the incoming RF signal is less than a first threshold value; and
disabling the frequency response controller if the fading value is greater than a second threshold value.

21. The method of claim 16, further comprising adjusting the one or more filter taps to maintain a bandwidth of the equalizer filter above a predetermined level.

* * * * *